May 19, 1953 D. B. PARKINSON 2,639,332

ROTATING-FIELD PULSE TRANSMITTER

Filed March 13, 1950 3 Sheets-Sheet 1

INVENTOR
D. B. PARKINSON
BY William F. Simpson
ATTORNEY

INVENTOR
D. B. PARKINSON
BY William F. Simpson.
ATTORNEY

May 19, 1953 D. B. PARKINSON 2,639,332

ROTATING-FIELD PULSE TRANSMITTER

Filed March 13, 1950 3 Sheets-Sheet 3

INVENTOR
D. B. PARKINSON
BY William F. Simpson.
ATTORNEY

Patented May 19, 1953 2,639,332

UNITED STATES PATENT OFFICE 2,639,332

ROTATING-FIELD PULSE TRANSMITTER

David B. Parkinson, Cleveland Heights, Ohio, assignor to Bell Telephone Laboratories, Incorporated, New York, N. Y., a corporation of New York Application March 13, 1950, Serial No. 149,326

5 Claims. (Cl. 179—90)

This invention relates to telephone calling or signalling circuits, apparatus and methods, and more particularly to telephone calling methods, circuits and apparatus of the preset type which generate pulses of electric current for transmission over voice frequency telephone channels to control automatic switching equipment for the establishment of communication paths between a calling subscriber and a called subscriber.

More particularly this invention relates to improvements in telephone signaling methods, circuits and equipment of the type set forth in a patent application of Lovell-Parkinson Serial No. 35,926, filed June 29, 1948, which issued as Patent 2,587,635 on March 4, 1952.

The system disclosed in that application employs a motor mechanism at a subscriber's station which is actuated by power transmitted over the subscriber's line.

An object of the present invention is to provide improved and simplified signaling and calling methods, circuits and apparatus at a telephone subscriber's station for the transmitting of similar types of signalling pulses in which a motor mechanism with a rotating or moving armature is not required. Neither are any moving contacts required to generate the signaling pulses, thus eliminating the cost of maintenance of said mechanical devices as motors, contacts and the like.

In the above-identified application of Lovell-Parkinson the subscriber's station is provided with a group of manually controlled switches or dials which the subscriber sets in accordance with the number or station designation of the called subscriber. These finger wheels are interconnected between two motor driven distributors in that application, one operating at a relatively low speed to select a particular number wheel or digit and the other operating at a relatively high speed for generating pulses representing the digit to be transmitted.

A feature of the present invention relates to an improved arrangement for generating the pulses operating at high speed and thus replacing the high-speed distributor of that application which results in improved operation and reduced maintenance costs of the subscriber's station set.

In the above-identified application and in the exemplary embodiment of the present invention described herein in detail, the calling apparatus generates pulses in which the magnitude of each of the digits or identity of the symbols comprising the called station designation is represented by the time elapsing between a reference or start pulse and the stop or digit pulse. The pulse generating equipment is arranged to generate two pulses for each digit of a called subscriber's designation, the first pulse is usually called the start pulse and the second pulse a stop pulse. The two pulses representing one digit are followed by two pulses representing the succeeding digits and so on. The pulses representing a complete subscriber's designation are spaced from other pulses representing another repetition of the same subscriber's designation by means of a blank spacing interval during which no pulses are transmitted. This blank or spacing interval is longer than the interval between any of the pulses representing any of the digits, numbers or other information represented by the pulses.

In transmitting pulses of short duration over voice frequency transmission paths, difficulty is frequently encountered due to transients set up by the pulses. The transients are usually decaying alternating currents which are caused by resonance circuits employed in telephone transmission paths, repeat coils, filters and other transmission equipment. Transients resulting from the application of short pulses to such equipment persist for a number of cycles and thus for an appreciable interval of time after the exciting pulse has terminated.

In accordance with the present invention, the transmitting apparatus is arranged to space the signaling pulses transmitted so that ample time is allowed for the transients associated with or appearing incident to the application of each of the signaling pulses to the signaling or transmission system to die out sufficiently so that each transient will not interfere with the next signaling pulse.

The manner in which the apparatus in accordance with the present invention may be incorporated in a complete telephone system is disclosed in a copending application of W. A. Malthaner, Serial No. 35,925, filed June 29, 1948, which issued as Patent 2,620,399 on December 2, 1952. Suitable types of equipment for responding to the signaling pulses transmitted from apparatus disclosed herein are disclosed in the copending applications of Vaughan, Serial No. 35,911, filed June 29, 1948, which issued as Patent 2,603,715 on July 15, 1952; Malthaner, Newby and Vaughan, Serial No. 68,234, filed December 30, 1943, which issued as Patent 2,615,971 on October 28, 1952.

Novel features disclosed but not claimed herein are claimed in different ones of the above-identified patent applications or in the patent application of D. B. Parkinson, Serial No. 39,015, filed July 16, 1948, which issued as Patent 2,499,606 on March 7, 1950.

In accordance with an exemplary embodiment of the present invention a slow-speed distributor mechanism is provided which is driven by a stepping mechanism which makes one step in response to each half cycle of an applied alternating current. In addition, the signaling pulses are generated during each half cycle of the applied alternating current by a pulse generator comprising means for producing a rotating magnetic field from polyphase alternating currents. These alternating currents may be obtained from power supplied over the subscriber's line or they may be applied from an alternating-current power source local to a subscriber's station, or supplied to the subscriber's station independently of the subscriber's line. As shown in the drawing, the power is obtained over the subscriber's line and the phase of the various currents controlled by phase networks at the subscriber's station.

A plurality of saturable magnetic members are angularly disposed in the rotating magnetic field.

Each of these saturable magnetic members is provided with a winding and the members are positioned in the magnetic field in accordance with the time at which it is desired to have a pulse generated in the winding interlinking the various saturable members. The pulses are generated in the windings surrounding these members at substantially the time at which the flux through the member passes through zero, that is, when it is changing most rapidly. At all other times during each cycle or half cycle of the alternating current or during each half rotation of the magnetic field these saturable members are substantially saturated so that the flux through them does not change materially.

Thus, during each complete cycle or rotation of the magnetic field the flux goes through zero at two regular positions in the field. As a result, each coil will have two pulses induced in it for each complete cycle of the applied alternating current or rotation of the magnetic field, assuming of course, that the applied alternating current is employed to generate a two-pole magnetic field analogous to a two-pole induction motor. If the input windings which produce the magnetic field are arranged to generate more poles in the field, then each pair of poles will induce two pulses in each winding during each complete rotation of the magnetic field which is again equivalent to two pulses for each cycle of the applied alternating current.

In general, the presence of saturable magnetic elements may produce some small distortion in the magnetic field so that it may be necessary to determine the exact position of these elements experimentally to compensate for such distortions of the field as they may produce. Thus eleven such elements in all will be required, one for the start pulse and one for each of the ten stop or digit pulses representing the digits 0 to 9. A pulse is produced from each of the coils during each half cycle of the applied alternating current.

The foregoing and other objects and features of the invention will be apparent from the following description, the novel features of which are set forth in the appended claims, when read with reference to the drawings, in which:

Figures 1, 3:
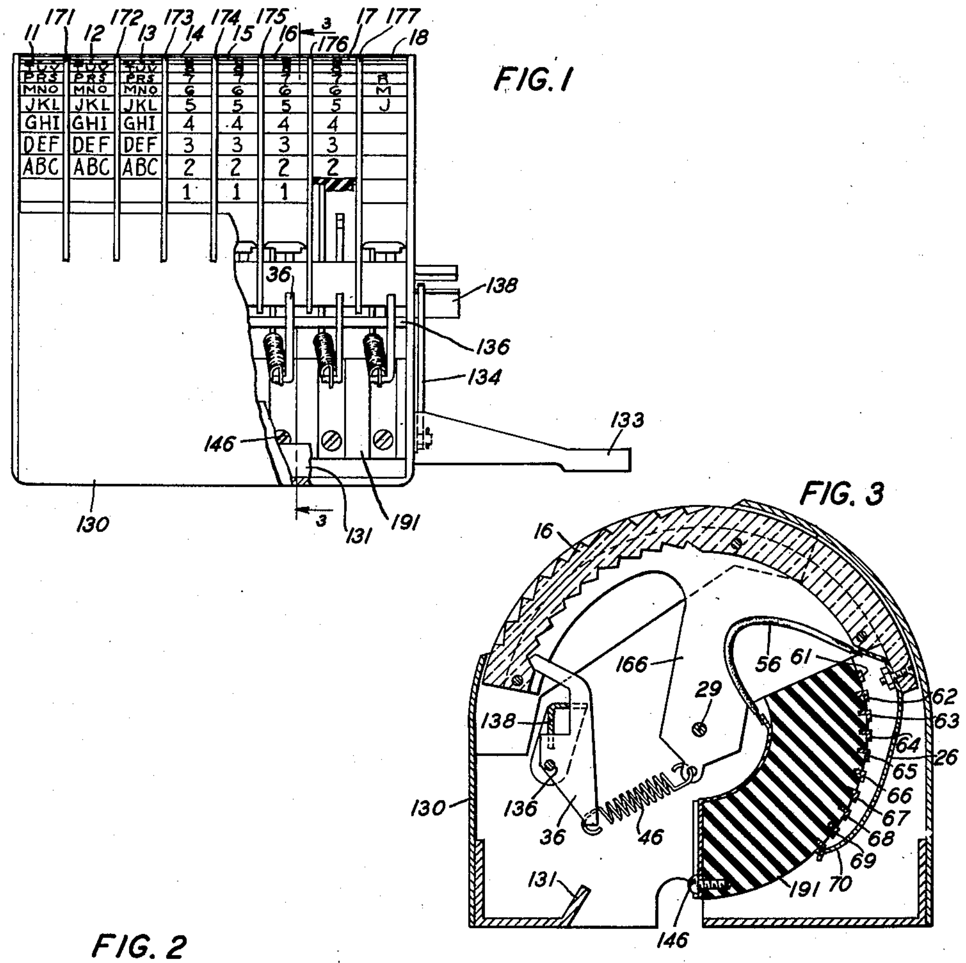
Fig. 1 is a front view partly broken away of the dialing or selecting apparatus.
Fig. 3 shows a section taken along line 3—3 of Fig. 1.

In the exemplary embodiment shown, provision is made for the generation of pulse representations of eight characters during each cycle of operation, and these pulses are repeatedly generated as long as the alternating-current supply is connected to the generator and stepping switch. Any arbitrarily chosen number of representations of characters (within reasonable limits may be generated by properly designed signaling apparatus. A maximum of eight representations of characters was selected for this disclosure since eight-character calling numbers are in common use in telephone systems. It will be understood that these characters may be digits or letters or a combination of the two as commonly used in designating telephone calls. Each of the digits 0 to 9 will be represented by a different combination of two pulses; the pulse combination representing the digit 2 will also represent the letters A, B and C; the pulse combination representing the digit 3 will also represent the letters D, E and F; and so on. Hereinafter each combination of eight characters will be referred to as each called number irrespective of whether the combination comprises digits or letters and digits.

In accordance with an exemplary embodiment of this invention, each of the pulses generated is of about 1 millisecond in duration. When pulses of this duration are transmitted over various types of voice frequency communication paths encountered in telephone systems, about 3½ milliseconds are required for the longest transients to die out sufficiently so that the succeeding pulse may be accurately recognized without interference from the transient caused by the previous pulse. In other words, each transmitted pulse of approximately 1-millisecond duration is in effect lengthened by a decaying alternating current of approximately 3½-millisecond duration. At the end of this 3½-millisecond period or any time thereafter a second pulse may be transmitted.

The signaling system employed in the exemplary embodiment of the invention set forth herein generates a start pulse of about 1-millisecond duration for each character, the start pulses being generated at 12½-millisecond intervals as long as the power is supplied, and a stop pulse of about 1-millisecond duration for each character, each stop pulse starting during the 4- to 8½-millisecond interval of time after the start of the start pulse. In order to provide sufficient margins of safety to permit reliable signaling, 4 milliseconds are allowed for the decay of each pulse and the times of the start of transmission assigned to stop pulses representing digits of successive magnitudes differ by ½ millisecond. Thus, digit 1 is represented by a start pulse followed by a stop pulse which is initiated 4 milliseconds after the start pulse was initiated, digit 2 is represented by a start pulse followed by a stop pulse which is initiated 4½ milliseconds after the start pulse was initiated, and so on. It will be observed that the stop pulse for the digit 0 is initiated 8½ milliseconds after its start pulse and 4 milliseconds before the next succeeding start pulse. Thus, there is required an increment of time of 4 milliseconds for the generation and decay of the start pulse, nine increments of time of ½ millisecond each for the start of the generation of a pulse at any one of the ten times necessary to represent the various digits, and a last increment of time of 4 milliseconds, all of the latter being required to permit the stop pulse to decay only if it should occur at the end of the ninth increment of time. Consequently, 12½ milliseconds of time elapse between the start pulses of succeeding digits, from which it follows that 12½ milliseconds is required in this exemplary system to transmit each character designating the called number. In order to indicate the starting point of the transmission of a called number, a time interval of approximately 25 milliseconds is provided at the beginning of the pulses representing a complete called number during which no pulses are transmitted. Thus, 125 milliseconds of time are required to transmit the no-signal period and the pulse representations of an eight-unit number.

As discussed hereinbefore, the apparatus disclosed by this invention comprises a pulse generator, a stepping distributor and a selector switch which interconnects the pulse generator to the distributor so that pulse representations of any eight-unit called number may be impressed across the telephone line.

Figure 2:
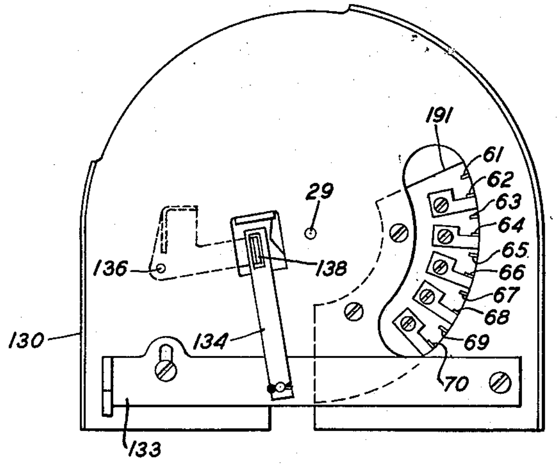
Fig. 2 is a side view of the same apparatus.

Figs. 1, 2 and 3 indicate one embodiment of the selector switch. It is enclosed in case 130, and selector dials 11 to 18 and release lever 133 are accessible to an operator. The selector dials are made of a non-conducting material such as hard rubber or plastic, and each dial is provided with ten indentations along its outer periphery. Each indentation is designated by a letter or number or both, conforming to the telephone signaling system, and each is of suitable configuration to permit a person's finger to engage and move the dial. The selector dials are separated by spacers 171 to 177, inclusive, which are attached to case 130. As indicated in Fig. 3, each dial is attached to an individual support 166 so that each dial may be moved approximately one-fourth of a revolution about shaft 29. The inner surface of each dial is provided with ten grooves which correspond to the finger indentations on the outer periphery of the dial. The grooves on each dial serve to engage with a detent pawl to secure each dial in one of the ten possible positions as selected by the operator. As indicated in Fig. 3, detent pawl 36 which cooperates with dial 16 is pivoted about shaft 136. Spring 46 is attached between support 166 and pawl 36 so that pawl 36 is normally forced against dial 16, thereby securing the dial in a fixed position by engaging with one of the ten grooves. Spring 46 also serves to apply a continuous force to support 166 which tends to rotate support 166 and dial 16 in a clockwise direction about shaft 29. The grooves on the dials and the detent pawls are shaped and positioned so that by pressing upon the finger indentations on the dials an operator can move the dial in either direction and so that the ratchet action of the pawl against the grooves secures the dial in any of the ten positions to which it may be moved. The rotary movement of the dials is limited to about one-fourth of a revolution by stop 131 and insulator 191.

Release arm 138 is connected with release lever 133 through lever 134 (Fig. 2) and is provided with slots to engage each detent pawl. When lever 133 is in its normal position, arm 138 permits each detent pawl to engage with a groove in the corresponding dial. When lever 133 is depressed, arm 138 is moved in a clockwise direction about shaft 136 and the detent pawls are disengaged from the dials, thereby permitting the spring associated with each dial to cause each dial to return to its initial position.

A spring contact is connetcted to each dial, and each dial and spring contact may be moved so that the spring contacts may be connected with any one of ten conductors. As indicated in Fig. 3, spring contact 26 is attached to dial 16 and it is electrically connected to terminal 146 through conductor 56. Insulator 191 supports the various terminals and conductors, and the ten conductors 61 to 70 which may be contacted by spring contacts 21 to 28 are mounted thereon.

Figure 4:
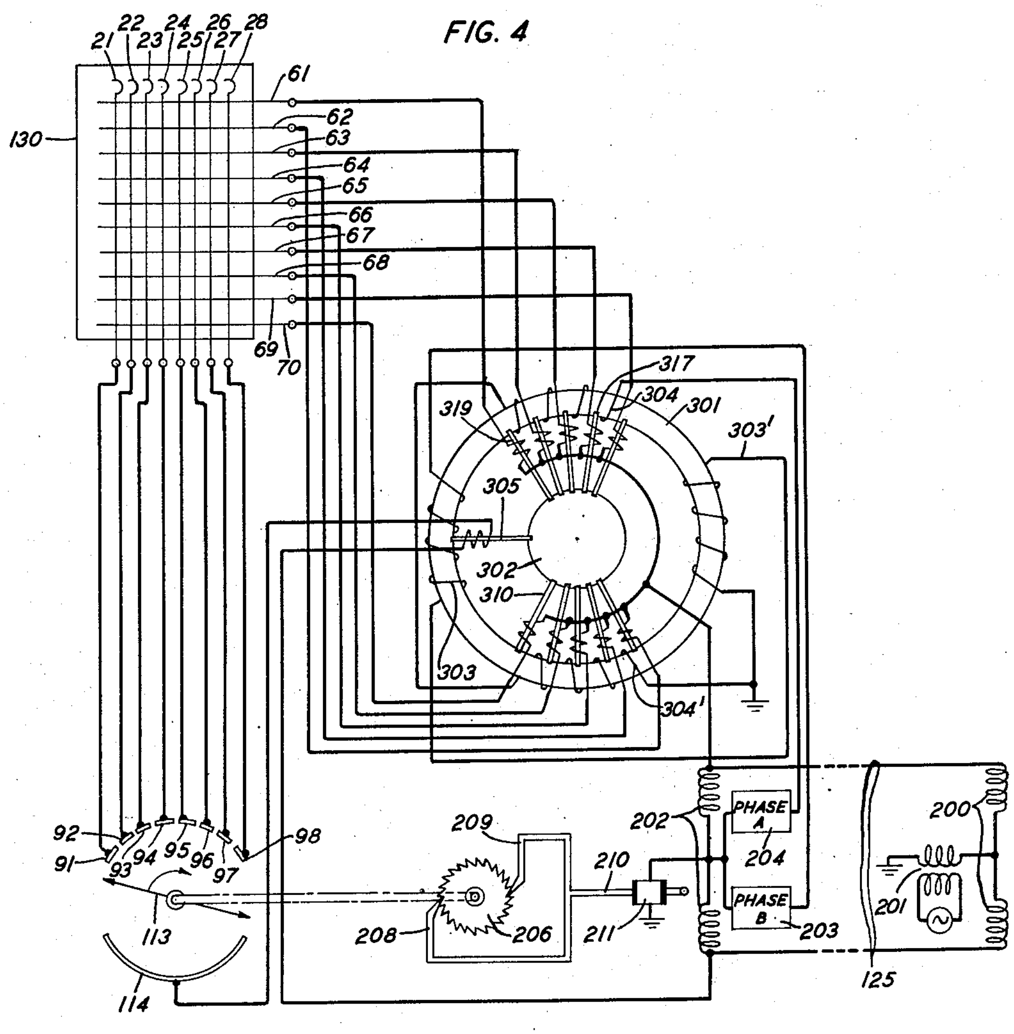
Fig. 4 shows the manner in which the finger wheels or dials, the slow-speed stepping mechanism, the rotating field pulse generator, and other apparatus are interconnected to cooperate one with another and with a telephone transmission line for generating and transmitting the desired pulses representing a called subscriber's designation.
Figure 5:
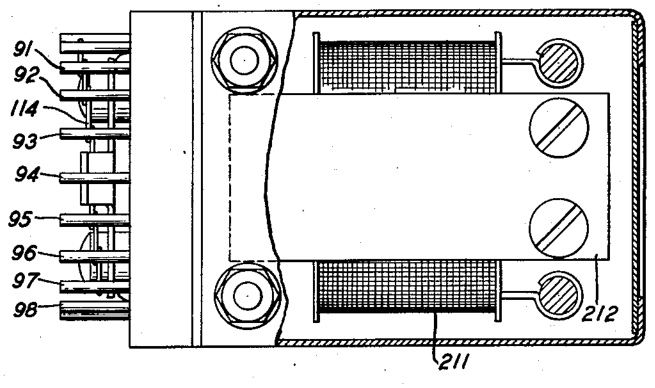
Fig. 5 shows a top view of a suitable slow stepping device.
Figure 7:
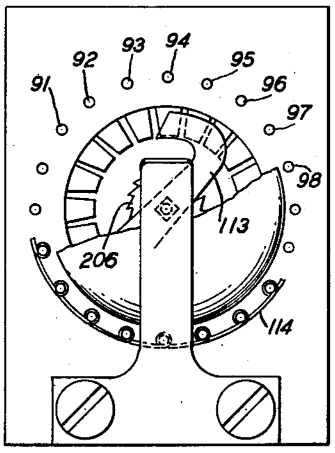
Fig. 7 is a front view partially broken away of the stepping mechanism.
Figure 6:
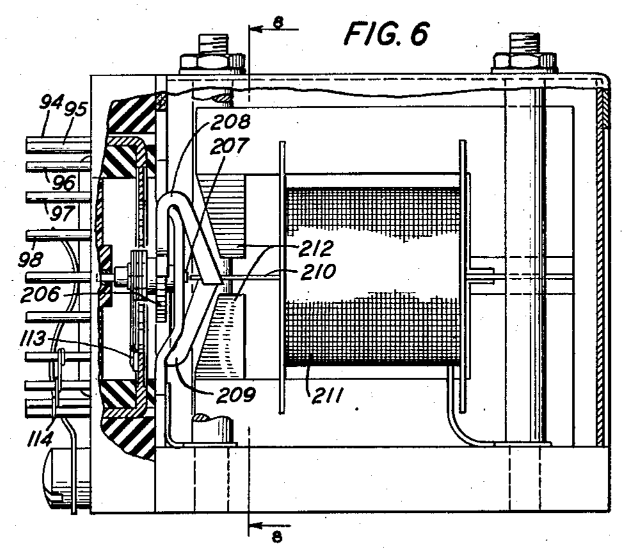
Fig. 6 is a side view partially broken away of the stepping mechanism.
Figure 8:
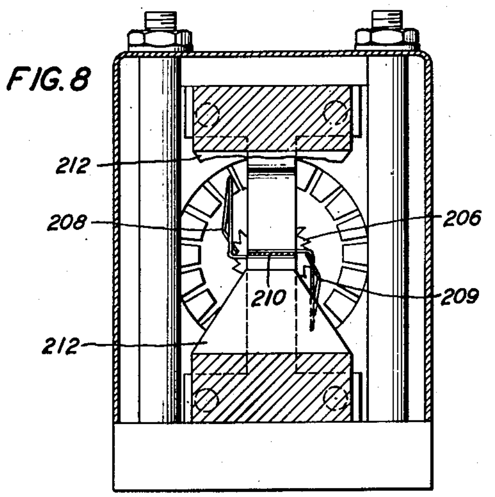
Fig. 8 shows a section partially broken away taken along line 8—8 of Fig. 6.
Figure 9:
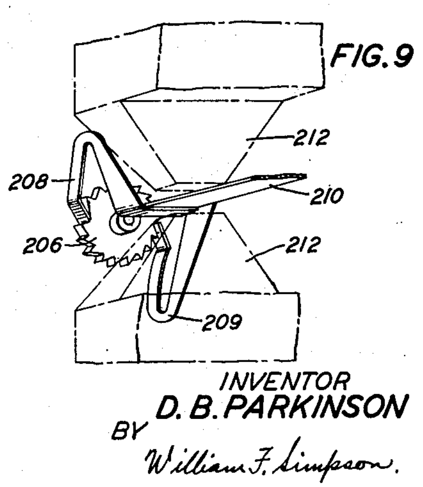
Fig. 9 is a partial disclosure of the stepping mechanism showing the pole-pieces, the armature and the stepping pawls and ratchet wheels.

The contact members 21 through 28 are connected to commutator segments 91 to 98 and conductors 61 to 70 are connected to the windings interlinking the saturable members 305 and 310 through 319 as indicated in Fig. 4 wherein selector switch 130 is indicated in schematic form.

In addition to the dials or manual selecting wheels and switches represented by 130 in Fig. 4, a slow-speed stepping mechanism is represented by brush arm 113, distributor segments 91 through 98, inclusive, and 114, ratchet wheel 206, and pawls 208 and 209 which are attached to armature 210 which in turn is actuated by the winding 211.

The pulse generating equipment is shown schematically in Fig. 4 connected to the subscriber's line 125 through the manually controlled selecting mechanism 130 and the stepping mechanism comprising brush arm 113 and stepping magnet 211, as well as the ratchet wheel 206 and pawls 208 and 209.

As shown in Fig. 4, the magnetic structure comprises an outer shell or ring 301 and an inner ring or pole-piece 302. The magnetic field is generated radially across the space between these pole-pieces by means of two windings 303 and 304 which windings are supplied with different phases from a polyphase source of alternating current. These windings are disposed on the field structure so as to produce a rotating field in a well-understood manner. They are shown on the core disposed 90 degrees one from another in well-understood schematic fashion. When these windings are energized by two-phase alternating current and have a 90-degree phase displacement between them, a radial two-pole magnetic field is produced in the space between these poles. A start pulse coil 305 and ten stop pulse coil structures 310 through 319, inclusive, are also provided. These structures are made of readily saturable material such as iron-nickel alloys or other suitable ferromagnetic material. These saturable magnetic elements, as shown on the drawing, are angularly disposed in the radial magnetic rotating field so that the zero of the field will pass these elements at successively different intervals of time, thus generating pulses in the windings interlinking these members at successively different intervals of time. The outputs of the coils are connected to the bus-bars of the manually controlled dials, finger wheels, or selector switch 130.

Figs. 5, 6, 7, 8 and 9 show one embodiment of a suitable type of stepping device or switch and distributor. The distributor comprises a double-ended brush arm 113 moving over contacts 91 through 98 and 114. The brush 113 is driven by ratchet wheel 206 both of which are mounted upon shaft 207. The ratchet wheel 206 is driven by stepping pawls 208 and 209 which are attached to a vibrating magnetic reed 210. The magnetic structure is polarized by permanent magnet 212 so the magnetic reed 210 vibrates vertically as viewed in Figs. 6, 7, 8 and 9 in response to alternating current flowing in the coil 211 surrounding the reed. When alternating current is applied to coil 211 the magnetic polarity of reed 210 is changed each half cycle of the alternating current so that the reed moves upward and downward during each cycle. Each time reed 210 moves upward or downward carrying pawls 208 and 209, ratchet wheel 206 is moved one step by each of the stepping pawls. Thus the ratchet wheel 206 and brush 113 are moved one step for each half cycle of the applied alternating current.

In the embodiment shown in Fig. 4, the alternating current for energizing the stepping magnet 211 is obtained from the voltage appearing between the center point of the simplex coils 202 and ground. This current is in turn obtained from the power source connected between the conductors 125 of the subscriber's line and ground by means of a simplex circuit connection. As a result, the selector switch or slow-stepping distributor takes one step for each half cycle of the alternating current. When desired, the tuning of the magnetic reed 210 may be adjusted so that the stepping magnet advances the ratchet wheel 206 near the beginning of each half cycle preceding the generation of a start pulse. Thus the switch is not stepped at a time which would interfere with the proper generation of the pulses relating to each of the digits or symbols representing the subscriber's number.

Of course, the time of advancing of the ratchet wheel 206 may be adjusted either before or after the start pulse so long as the switch does not advance during any of the pulses and if compensating adjustments are made at the receiving end of the subscriber's line 125. When desired, the various times of advancing or stepping of the stepping switch relative to the time other equipment is actuated may be adjusted by means of electrical networks instead of mechanical adjustments on the reed and stepping pawls.

In operating the subscriber's station set, the subscriber will position the dials or finger wheels 11 through 18 and thus the spring or contact devices 21 through 28 in accordance with the number or other designation in the called subscriber's station. As a result, the contact members 21 through 28 will make contact with the selected ones of the bus-bars 61 through 70, inclusive, which extend to the magnetic type reed contact devices 71 through 80, inclusive.

After the subscriber has thus set his station equipment, he will initiate a call which, in turn, sets apparatus into operation in the central station, and as a result alternating current is applied to the subscriber's line.

As shown in the drawing, the source of alternating current is supplied from the central station or some distant point over both lines of the subscriber's line in parallel by means of simplex coils 200. A similar simplex coil or coils 202 is provided at the subscriber's station and the alternating current thus obtained from the center point of these coils and ground. Two phase-splitting networks, 203 and 204, are provided for obtaining two-phase alternating current from the power supplied from the distant point over the subscriber's line 125. The outputs of these phase networks are connected to the respective coils 303 and 304 and produce a rotating magnetic field as described above in the usual and well-understood manner. Of course, when it is so desired, the source of polyphase alternating current may be obtained locally at the subscriber's station if available.

Assume for purposes of illustration that upon the application of the alternating current to the subscriber's line 125 brush arm 113 will advance one step from the position shown in the drawing. Due to the adjustments of the stepping device and the rotating magnetic field within the core structure, shown in Fig. 4 after the brush arm 113 advances, a star pulse is generated in the coil 305 due to the direction of the flux reversing at this time. At this time a circuit extends from the lower conductor of line 125, the winding of coil 305, stepping switch or distributor segment 114, distributor brush 113, segment 91, contact spring 21, one of the bus-bars 61 through 70 and the winding of one of the coils 310 to 319 to the upper conductor of the subscriber's line 125. As a result, a start pulse is transmitted over the subscriber's line 125 a short interval of time after the brush arm 113 advances to segment 91. As pointed out above, the exact time of relationship between the generation of the start pulse and the advancing of the brush arm 113 may be controlled by the tuning and adjustment of the stepping mechanism 210, by the positioning of the start coil 305 relative to the energizing windings 303 and 304 and also by means of any desired types of phasing networks comprising any suitable circuit elements.

During the remainder of this half cycle a pulse is generated in each of the digit or stop pulse coils 310 through 319, inclusive. The exact time of the generation of the stop pulses is determined by the location of the coils and their saturable cores in the rotating magnetic field is described above. The pulses are generated in each of these coils when the flux reverses through the cores, in other words, at substantially the time the zero of the magnetic field passes the core, a pulse is generated in the windings of these coils. As pointed out above, some one of the coils will be connected through the spring contact 21 at this time. As a result, the particular coil, for example coil 317, is connected due to the spring contact 21, associated with the first dial of finger wheel 11, resting on bus-bar 67. Under the assumed conditions the stop pulse will be transmitted during the seventh stop pulse interval indicating a digit value of seven. This value may represent the numerical digit 7 or it may represent a corresponding letter of the alphabet in accordance with the usual telephone dial station designations.

It should be noted that a pulse is generated in each of the coils 305, 310 through 319 during each half cycle. However, as pointed out above, only one pulse is transmitted, namely, from coil 317 designating a digit value of seven or the letters P, R or S under the assumed conditions.

At or near the beginning of a next cycle of the applied alternating current received from line 125 or from any other suitable source, as described above, brush arm 113 again advances and makes contact with segment 92. As a result, when the pulse is generated in the start pulse 305, the circuit will be completed from a lower conductor of line 125 through the coil 305 and distributor segment 114, brush arm 113 and distributor segment 92 at this time to contact member 22 which likewise is positioned in engagement with one of the bus-bars 61 through 70 by the corresponding finger wheel 12 designating the second character or digit of the called subscriber's number or designation. During the remainder of the half cycle a stop pulse is again generated in each one of the digit or stop pulse coils 310 through 319, inclusive, and one of these will be transmitted, depending upon the position of the contact 22. It should be noted that at this time the pulses generated in all of the coils 305 and 310 through 319 will be of opposite polarity to the pulses generated during the first half cycle because the flux changes in the opposite direction through each of these coils thus generating a pulse of opposite polarity. In other words, the start pulse and the stop pulse representing any digit are of the same polarity but the start pulse and stop pulse representing a succeeding digit are of the opposite polarity to the pulses representing a preceding digit.

The above-described mode of operation then continues for the transmission of pulses representing each of the digits or characters in the called subscriber's number or station designation. Under the assumed conditions the above-described cycle of operation will be repeated for the transmission of eight characters, one for each of eight half cycles or four complete cycles resulting in the transmission of a start pulse and a stop pulse representing each of the denominal orders of the subscriber's number or symbol place of a designation. After the complete number has been transmitted, i. e., eight digits under the assumed conditions, brush arm 113 passes off segment 98 and also off of segment 114 and remains off all segments for two half cycles or one complete cycle of the applied alternating current. Thus, during this interval no pulses are transmitted which indicates to the equipment at the central office that pulses of one complete designation have been transmitted and that the following pulses transmitted will represent the various digital values of the subscriber's number transmitted thereafter. At the end of this silent interval or pause, the above-described operations are repeated during which two pulses representing each of the digits or symbols of a called subscriber's station designation or number are again transmitted.

The above-described mode of operation then continues for the transmission of all the information required at the switching centers. After sufficient pulses have been transmitted to control the equipment at all the switching centers necessary to establish a transmission path from the calling subscriber to the called subscriber, operation of the transmitting equipment, described herein, at the subscriber's station is interrupted by removing the source of alternating current from the line and other equipment provided at the central station as well as at the subscriber's station is actuated to establish a path to the called subscriber's station.

Numerous modifications of the above-described exemplary embodiment of the present invention will occur to people skilled in the art without departing from the spirit of the invention as set forth in the claims appended hereto.

What is claimed is:

1. In combination in a telephone signaling system, apparatus for generating a plurality of pulses comprising a subscriber's line, means for receiving alternating-current power from said line, phase adjusting networks for obtaining polyphase currents from said alternating current power, apparatus for generating a radial rotating magnetic field from said polyphase currents, a plurality of saturable magnetic elements radially disposed within said magnetic field, a winding surrounding each of said magnetic elements having a pulse generated therein as the zero of the rotating magnetic field passes the position of the respective magnetic elements, and switch means for connecting said winding to said line for transmitting said pulses over said line.

2. In combination in a telephone subscriber's station set, a subscriber's line connected thereto, means for receiving alternating currents from said line including phase control means for obtaining a plurality of different phases of alternating current, apparatus for obtaining a radial rotating magnetic field from said alternating currents, a plurality of saturable magnetic elements disposed in said field and saturated thereby, windings individual to each of said magnetic elements having pulses generated therein as the direction of flux through said saturable elements changes due to the rotation of said magnetic field, a manually controlled selector switch connected to said windings for selecting certain of said windings and a stepping distributor connected between said selecting switch and said subscriber's line for successively connecting selected ones of said windings to said subscriber's line.

3. In a telephone calling system, a subscriber's line, apparatus responsive to alternating current received over said line for generating polyphase alternating currents therefrom, means for producing a rotating magnetic field from said polyphase alternating currents, a plurality of saturable magnetic elements, windings individual to and each linked with its respective one of said elements, positioning means for positioning said elements radially in said field at selected positions in accordance with the time for a generation of pulses in the respective windings and switch means for selectively connecting said windings to said subscriber's line for transmission of pulses thereover.

4. In combination in a telephone signaling device, pulse generating apparatus comprising a core structure, a plurality of polyphase windings wound upon said core structure, a connection for applying polyphase alternating currents to said windings for producing a radial rotating magnetic field by said core structure and windings, a plurality of saturable magnetic elements radially disposed within said magnetic field, a winding surrounding each of said magnetic elements having a pulse generated therein as the zero of said rotating magnetic field passes the position of the respective magnetic element.

5. In a telephone calling system, a subscriber's line, apparatus responsive to alternating current received over said line for generating polyphase alternating currents therefrom, means for producing a rotating magnetic field from said polyphase alternating currents, a plurality of saturable magnetic elements, windings individual to and each linked with its respective one of said elements, positioning means for positioning said elements radially in said field at selected positions for generating pulses within said windings at the time at which the field reverses through said saturable elements and switch means for selectively connecting said windings to said subscriber's line for transmitting pulses from said coils over said line.

DAVID B. PARKINSON.

References Cited in the file of this patent

UNITED STATES PATENTS

| Number | Name | Date |
|---|---|---|
| 2,499,606 | Parkinson ---------- | Mar. 7, 1950 |